United States Patent [19]
Oliver

[11] 3,758,840
[45] Sept. 11, 1973

[54] POWER SUPPLY UTILIZING IMPROVED VOLTAGE REGULATION

[75] Inventor: Bernard M. Oliver, Los Altos Hills, Calif.

[73] Assignee: Hewlett-Packard Company, Palo Alto, Calif.

[22] Filed: May 15, 1972

[21] Appl. No.: 253,465

[52] U.S. Cl............................ 321/2, 321/18, 321/47
[51] Int. Cl. ............................................. H02m 7/20
[58] Field of Search ..................... 321/2, 16, 18, 19, 321/47

[56] References Cited
UNITED STATES PATENTS

| | | | |
|---|---|---|---|
| 3,413,538 | 11/1968 | Hodges | 321/2 |
| 3,185,912 | 5/1965 | Smith et al. | 321/18 |
| 3,218,540 | 11/1965 | Jackson | 321/18 |
| 3,305,763 | 2/1967 | Kupferberg et al. | 321/18 X |
| 3,320,512 | 5/1967 | Kruger | 321/19 X |
| 3,437,905 | 4/1969 | Healey et al. | 321/19 |

*Primary Examiner*—William M. Shoop, Jr.
*Attorney*—Roland I. Griffin

[57] ABSTRACT

A high efficiency, AC-to-DC power supply is provided in which a preregulator circuit including a rectifier bridge is coupled to an AC supply input. Two switching rectifiers, one in each of two arms of the bridge, are controlled by a preregulator control circuit for regulating the turn on time of the bridge and thus the DC output level thereof. An inverter circuit is coupled to the output of the bridge for converting the DC output therefrom to an AC signal with a frequency substantially higher than the AC supply input and with an amplitude dependent on the DC output level of the bridge. The output of the inverter circuit is coupled by a transformer to a rectifier circuit for developing a DC output dependent on the amplitude of the AC signal from the inverter circuit. A flux sensing circuit is coupled to the transformer for developing a feedback control signal dependent on the transformer flux density. The preregulator control circuit includes means responsive to this feedback control signal for controlling the turn on time of the switching rectifiers to thereby control the DC level at the bridge output and maintain a constant flux density in the transformer. In addition, the power supply includes means responsive to the load current for controlling the gain of the feedback loop to maintain a stable loop with fast response time.

9 Claims, 10 Drawing Figures

Fig_1

POWER SUPPLY UTILIZING IMPROVED VOLTAGE REGULATION

BACKGROUND OF THE INVENTION

Power supplies for converting standard supply line voltages at 115–230V AC and 50–60Hz to a plurality of DC voltage outputs for use with electronic equipment utilizing transistors and integrated circuits, for example computers, are in common use. As an example, a computer may require either positive or negative DC voltages at 2, 5, 12, 20 and 30 volts and currents ranging from 100 ma to 60 amps. These output voltages must be well regulated, and the power supply for the computer must operate from the standard AC supply line voltage subject to the usual type of random variations.

In one form of such power supply, the AC input voltage is first converted to a DC output voltage level by a preregulator circuit including a full wave rectifier bridge. This DC output voltage is then converted by an inverter circuit into an AC voltage at a frequency substantially higher than the frequency of the supply line voltage. A plurality of separate rectifier circuits coupled to the AC output of the inverter circuit via a coupling transformer provide the desired multiple output DC voltage outputs. Certain of these DC voltage outputs may be additionally converted by regulators such as switching regulators to further DC voltage outputs.

In these power supplies it is very important to maintain good regulation of the several DC voltage outputs with varying supply line and output load conditions.

SUMMARY OF THE INVENTION

In the power supply incorporating the present invention, the rectifier bridge utilized in the preregulator circuit includes controlled switches, such as silicon controlled rectifiers (SCR's), in two of the arms of the bridge. The turn on time of these two SCR's is controlled from a preregulator control circuit to establish the desired voltage level output from the rectifier bridge.

In order to control the SCR's of the rectifier bridge such that the several regulated DC voltage outputs are maintained with good independence from supply line and/or load variations, it is possible to measure the load current changes at one of the several DC voltage outputs and control the SCR turn on times in dependence thereon; however, regulation at the remaining DC voltage outputs would not be optimum. In the present invention, a novel flux sensing technique is employed to sense the flux density in the coupling transformer for the inverter circuits, and the flux changes are converted to an error feedback signal to control the turn on time of the SCR's and thus regulate the DC output voltage level of the rectifier bridge constant flux density in the coupling transformer for the inverter circuit and provide good overall regulation of the plurality of DC voltage outputs of the power supply.

In addition, the power supply includes a novel system responsive to the total load current output of the power supply for changing the gain of an amplifier system included in the preregulator control circuit and thereby altering the gain of the overall feedback loop of the power supply to maintain a stable loop with optimum frequency response over the entire range of load current variations.

DESCRIPTION OF THE PREFERRED EMBODIMENT

Figure 1:
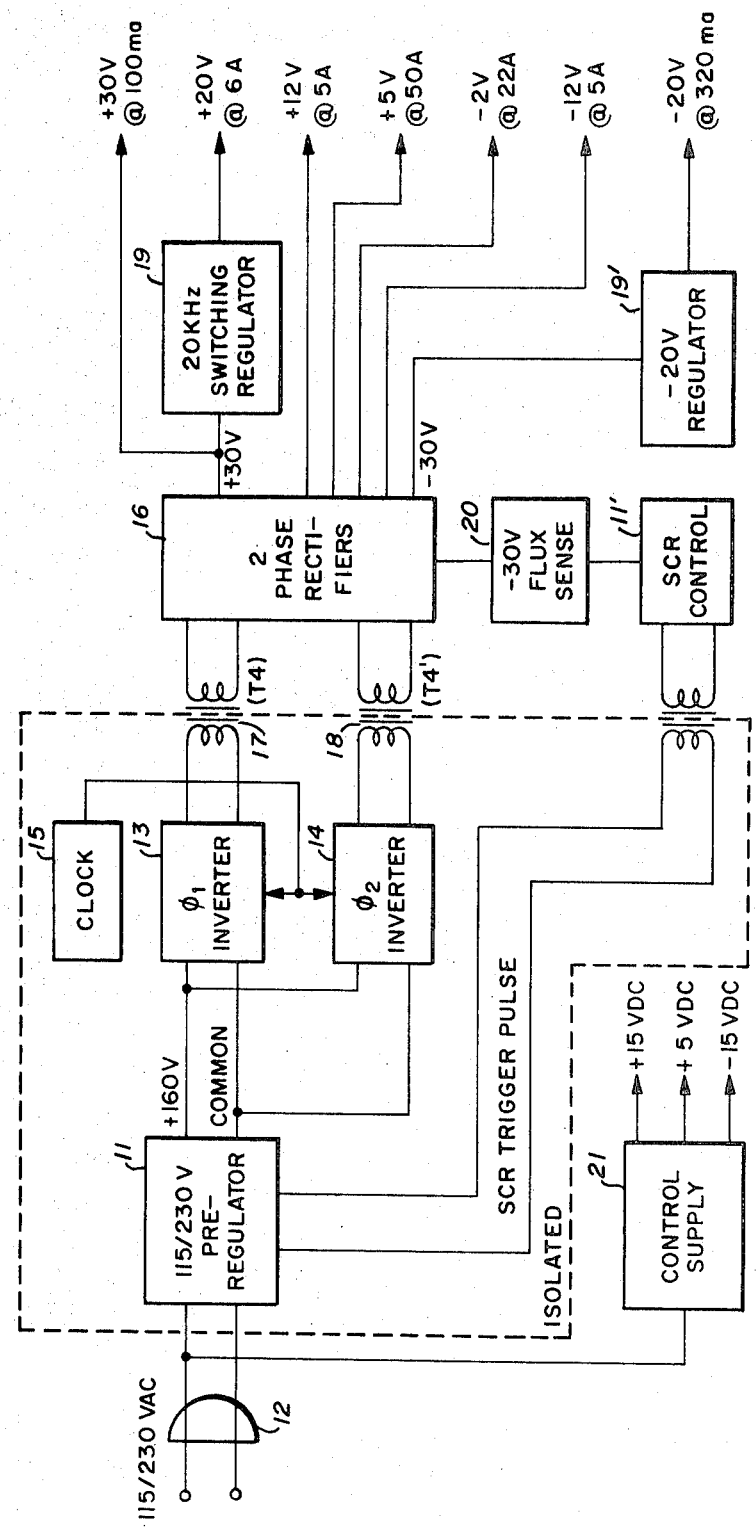
FIG. 1 is a block diagram of a power supply incorporating the present invention.

Referring to FIG. 1, the power supply comprises a preregulator circuit 11 including a rectifier bridge connected across the 60Hz 115 volt supply line 12 and producing a DC voltage output at, for example, 160 volts. The bridge includes two SCR's and two diodes, and a choke and capacitor in the output loop. A control circuit 11' for controlling the turn on time of the SCR's dependent on the level of the supply output voltage and thus regulating the DC output level, is included in the preregulator circuit. In addition, two other control functions are provided in SCR control circuit 11'; one compensates for variations in input line voltage by changing the SCR trigger time in accordance with the line voltage, and the other compensates for load current variations by changing the gain of the feedback loop in accordance with load current changes.

The output of the preregulator 11 is transmitted to a pair of inverter circuits 13 and 14 each converting the DC input voltage to a square wave AC output at a frequency substantially higher than the 60Hz line frequency, for example 800Hz, as determined by clock 15. The square wave outputs of the two inverters 13 and 14 are out of phase by 90°, so that the half-wave of one overlaps the commutation interval of the other and vice versa.

These two inverter outputs are then converted to the desired output DC voltage levels by a rectifier circuit 16 including a pair of transformers 17 and 18. One of these output voltage levels is converted to a different output voltage level by a 20KHz switching regulator circuit 19, and another is converted to a different voltage level by means of a series-shunt regulator 19'.

A flux sensing circuit 20 associated with the transformers 17 and 18 transmits a signal related to flux change to the preregulator circuit to control the SCR turn on and thus regulate the flux in transformers 17 and 18. A separate power supply 21 provides the voltages necessary for this system.

Figure 2:
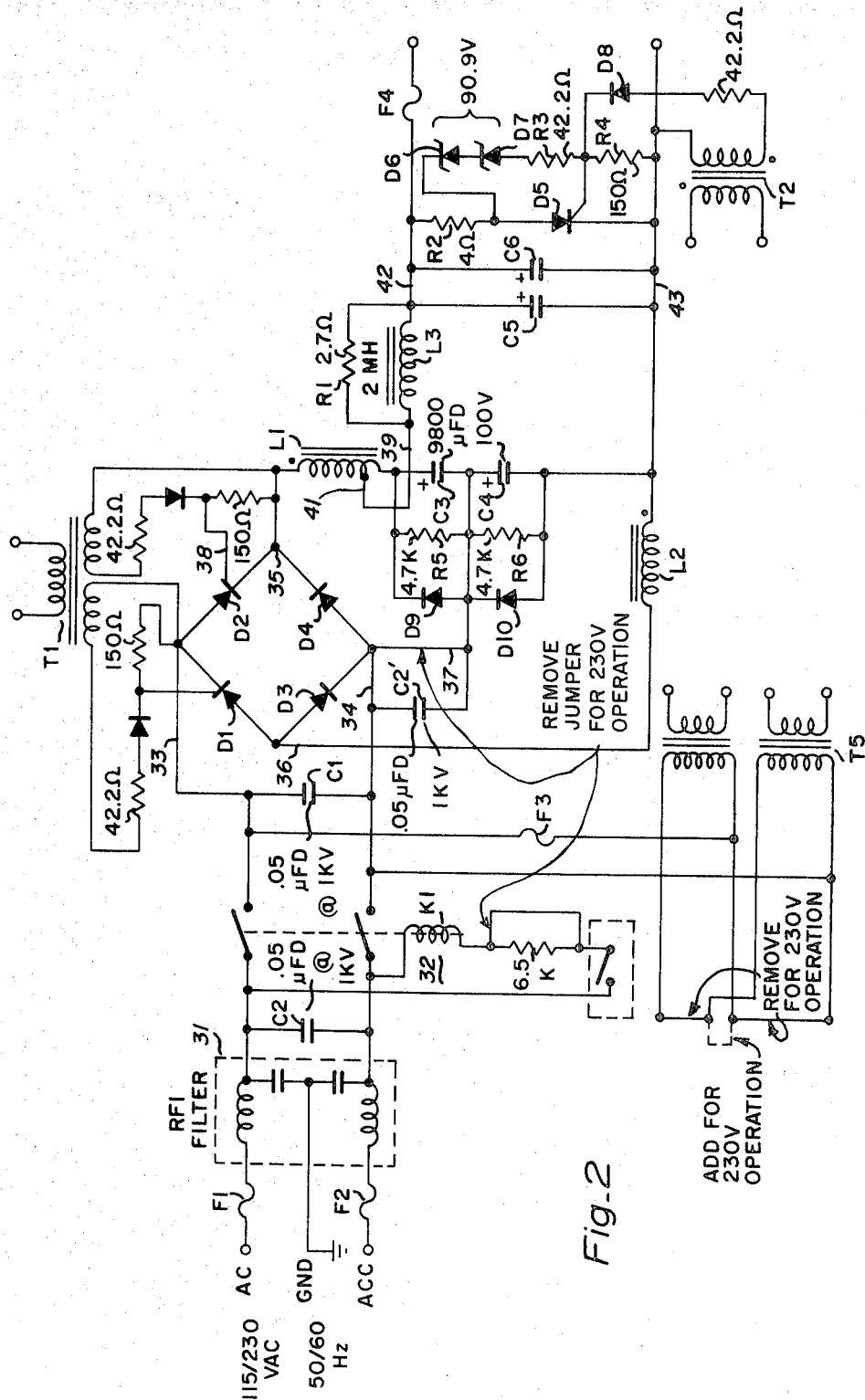
FIG. 2 is a schematic diagram of the preregulator circuit stage of the power supply.

Referring to FIG. 2, the preregulator circuit comprises an SCR bridge connected across the supply line, which may be 115 or 230 volts AC, double fused at F1 and F2 because of the high current drain. An RFI filter 31 is provided in the line to guard against RF transients feeding back into the line from the SCR switching bridge and to keep line transients from disrupting the supply. Because of the high current values, a relay switch 32 is utilized to establish the energized condition for the system. Capacitors C1, C2 and C2' are included for the purpose of containing any current surges in the bridge loop due to the switching SCR's.

The bridge circuit comprises two SCR's D1 and D2 in the two arms thereof connected to one side 33 of the incoming line and two diodes D3 and D4 in the other two arms connected to the other side 34 of the incoming line. The output terminals 35 and 36 of the bridge are coupled via a first inductor winding L1, two series connected capacitors C3 and C4, and a second inductor winding L2, the two inductor windings L1 and L2 being wound on the same core so as to be mutually coupled and being interconnected so as to be aiding around the loop 35, L1, C3, C4, L2, and 36. A switch or strapping arrangement 37 is provided so that the lower input bridge terminal 34 may be connected to the midpoint of the two capacitors C3 and C4 for operation from a 115 volt input line. For 230 volt input line operation, the strapping 37 is removed.

The operation of this bridge circuit is as follows for 230 volt operation with the strap 37 removed. During the positive half cycle, SCR D2 is turned on by a pulse at gate 38 via the gate control circuit including transformer T1, and current flows through diode D2, inductor L1, capacitors C3 and C4, inductor L2, and diode D3 to the other side of the line. Because of the mutual inductive coupling, and aiding interconnection, the inductance around the loop is approximately four times the inductance of the individual coils. During the negative half cycle, SCR D1 is turned on and the current flows thrugh the loop including diode D4. By straightforward bridge rectifier action, a full wave rectified voltage appears at line 39 with a DC value of 0.636 times the voltage peak of the incoming wave, i.e., about 206 volts for the 230 volt AC input when the SCR's are turned on at the beginning of each half-cycle. The firing angle is adjusted by the feedback control loop including SCR control circuit 11' (see FIG. 1) in such a manner as to hold the output to 160 volts DC.

For the 115 volt input line operation, a voltage doubling is provided by this bridge circuit. The strap 37 is established and, during the positive half-cycle of the incoming signal, the current loop is traced through SCR D2, inductor L1, capacitor C3 to the low line terminal 34 of the bridge via strap 37. For the negative half-cycle, the circuit is traced from the lower line 34 through the capacitor C4, inductor L2 and diode D1 to the upper side of the line. During the time that current is flowing through C3, the voltage drop across L1 also appears across L2 due to the mutual inductive coupling, and this voltage back biases diodes D1 and D3 so that no current can flow in L2 during the positive half-cycle. During the negative half-cycle D1 conducts current through L2 charging C4 and the voltage drop across L2 appears across L1 and back biases diodes D2 and D4.

The energy stored in one inductor during one half-cycle is transferred to the other inductor due to the mutual inductive coupling during the next half-cycle to thereby cause the current in the other inductor to rise to a value twice as great as in the bridge operation on the 230 volt input line. Thus, a forced voltage doubling action takes place in the 115 volt input line case, and the output line 39 is maintained at the controlled level of 160 volts.

So that the current in the output loop of the bridge will never drop to zero during the commutation intervals when the input wave form is going from positive to negative or vice versa, the inductors L1 and L2 must be of such a size that the energy stored in each is sufficient to maintain current flow during the half-cycle when no current is supplied to the respective capacitor from the supply line.

For any given value of load resistance, a value of critical inductance can be specified for maintaining this continuous current flow. However, with the high voltage and current requirements for this circuit, maintaining critical inductance values for L1 and L2 requires an inductive structure L1 and L2 of large size and weight. When employing an inductive structure of a smaller size and weight, the inductance values of L1 and L2 fall below the critical value and the end result is that, during the commutation periods, the current in the inductors is depleted and the load current is maintained by a discharge from the capacitors C3 and C4, thus producing a larger ripple voltage on the output line 39.

A ripple reduction circuit is provided which operates to both double the frequency of the ripple voltage and, at the same time, significantly reduce the peak-to-peak voltage of the ripple, thus providing substantialy improved regulation and reduced ripple while still permitting the use of inductors L1 and L2 of substantially reduced size and weight. This ripple reduction circuit comprises a tap 41 in the inductor L1, the inductor L3 and the capacitors C5 and C6 across the output line. Two capacitors are used in lieu of one solely for the purpose of obtaining a higher capacitance value with two components more easily fitted within the power supply package.

With the tap in inductor L1, a small voltage signal is obtained which resembles the wave form at terminal 35, and this voltage is added in series with the ripple at the junction of inductor L1 and capacitor C3. The phase of this small voltage is such that it sums with the line ripple to, in effect, fill in the valley portions of the 120 cycle ripple. This produces a wave form on the output line 39 at a frequency of 240 Hz with a peak-to-peak amplitude about one half the value of the ripple voltage at the junction of inductor L1 and capacitor C3. This higher frequency ripple is more easily filtered by the inductor L3, which is substantially smaller than the inductor that would be needed with a ripple frequency of 120Hz. A resistor R1 connected across the inductor L3 serves to lower the Q to avoid any resonances therein. Thus the effect of undesired ripples generated on the 160 volt line by the use of a significantly smaller inductive structure L1 and L2 is compensated by doubling the ripple frequency and cutting the peak-to-peak amplitude by a significant factor, for example one fourth, at the output line 42. By this technique it has been possible to reduce the value of inductors L1 and L2 from about 50 millihenrys to about 7 to 8 millihenrys while maintaining the same size capacitors C3 and C4. Inductors L1 and L2 are chosen to limit the value of peak current flowing in the primary circuit.

A crowbar circuit comprising the SCR D5, a resistor R2, diodes D6 and D7, and resistors R3 and R4 is included for the purpose of power supply and load protection. The two diodes D6 and D7 have values such that the voltage threshold is set at about 180 volts as an upper trip limit. Should the 160 volt line 42 attempt to exceed the 180 volt drop of D6 and D7, the gate of the SCR D5 is turned on. SCR D5 acts to pull the 160 volt line 42 down rapidly. Resistor R2 serves to limit the peak current in SCR D5. In addition, the gate of SCR D5 can be controlled via diode D8 and transformer T2 from a voltage or current sensing circuit in the load circuit of the system. In addition to the crowbar circuit, the bridge may also be turned off by interrupting the flow of gate pulses to the gates of the SCR's D1 and D2 via the transformer T1 from the preregulator control circuit described more fully below.

The resistors R5 and R6 are provided across the capacitors C3 and C4 for the purpose of discharging the capacitors within a reasonable period of time, for example 1 minute, so that the circuit may be safely worked on after it is turned off.

Diodes D9 and D10 are provided across the capacitors C3 and C4 to protect these capacitors during the crowbarring of the 160 volt output line 42 by D5. Because of the tolerances in the values of C3 and C4, one of these capacitors may be larger than the other by a significant amount. Therefore, during pulldown of the output line 42, the smaller capacitor depletes much faster than the larger capacitor, and the net result, when a zero voltage is reached between the high line 42 and the common line 43, would be a voltage at the junction of the capacitors C3 and C4 proportional to the capacity imbalance. This voltage would be in an inverse direction across the smallest capacitor and thus the diodes D9 and D10 are included to prevent problems due to reverse voltage across the capacitors.

Figure 3:
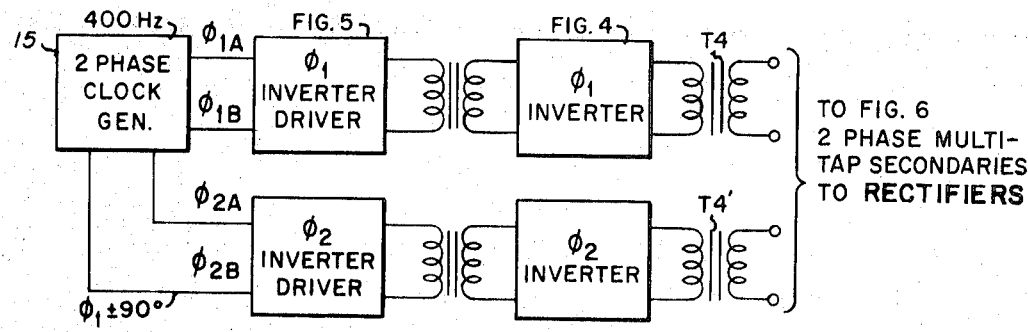
FIG. 3 is a block diagram of the inverter circuit stage of the power supply.
Figure 4:
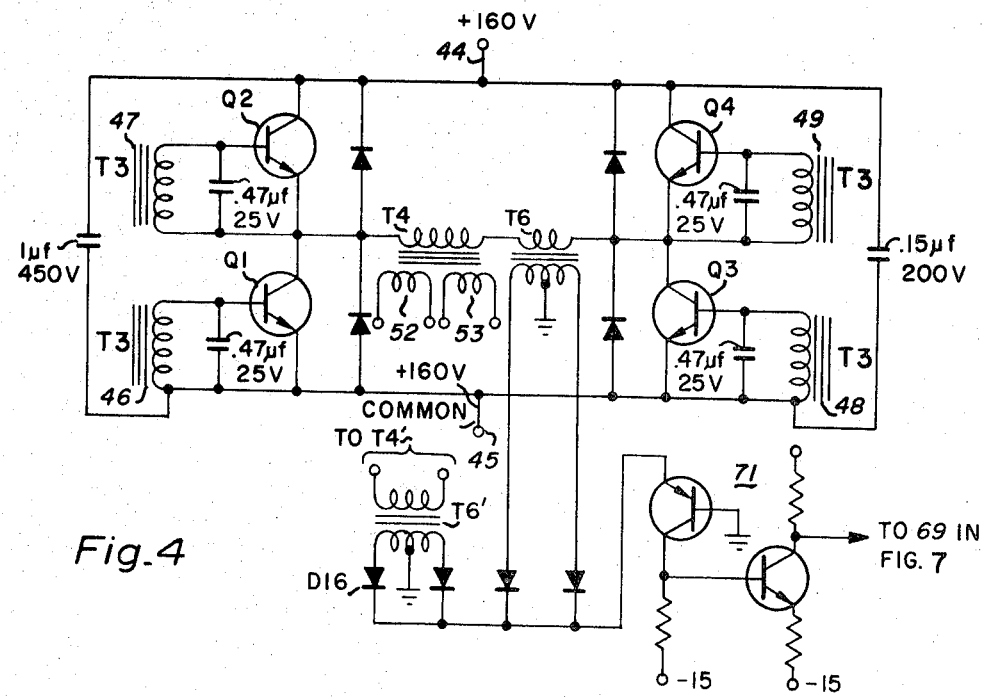
FIG. 4 is a schematic diagram of one of the inverter circuits of FIG. 3.
Figure 5:
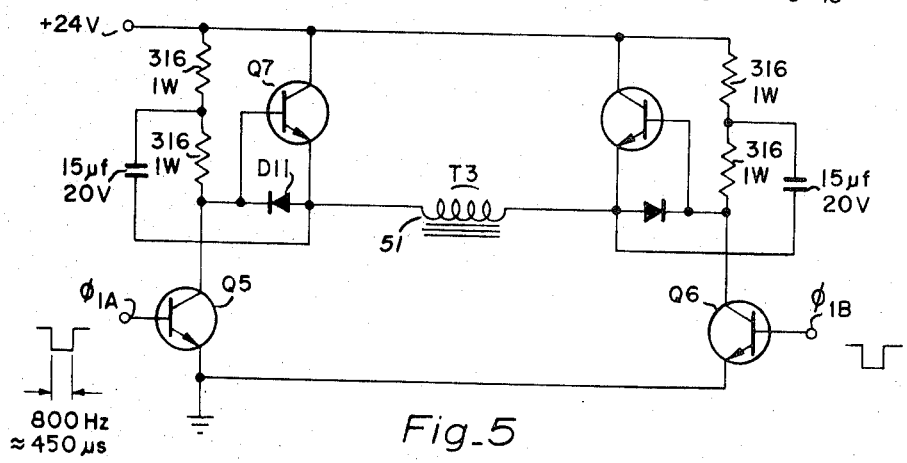
FIG. 5 is a schematic diagram of one of the inverter driver circuits of FIG. 3.

The 160 volt DC output of the preregulator circuit is coupled to two inverter circuits (see FIGS. 1 and 3), one of which is shown in detail in FIG. 4. These inverter circuits generate square wave voltages that are displaced by 90° with respect to each other. This 160 line 42 is connected to terminal 44, and the common line 43 is connected to terminal 45 of the inverter circuit. This bridge type circuit comprises four switches Q1, Q2, Q3, and Q4 with their bases connected to the secondary windings 46, 47, 48 and 49, respectively, associated with the primary winding 51 of transformer T3 in the inverter driver (see FIG. 5). The inverter driver circuit of FIG. 5 comprises a pair of "totem pole" driver circuits with the primary of transformer T3 connected across their outputs. The base drive for transistors Q5 and Q6 in the "totem pole" drivers is obtained from a clock source, e.g., 800Hz. When Q5 is on, Q7 is off and current flows through diode D11 and the collector of Q5 to ground. Q7 is held off by the diode drop. When Q5 is turned off, the voltage at the collector goes high, taking the base of Q7 up, and Q7 performs like an emitter follower bringing the left hand side of the transformer winding 51 high. The two totem pole driver circuits operate alternately to reverse the polarity across the primary transformer winding 51 at the 800 cycle rate thereby energizing the four secondary windings 46-49 at the same frequency rate.

The switches Q1 and Q4 of the inverter circuit of FIG. 4 conduct during one time interval of the cycle and the other two switches Q2 and Q3 conduct during the other time interval. Thus, a substantially square wave output at 800Hz appears on the two secondary windings, 52 and 53 of the transformer T4. Actually, the wave form is not a true alternating square wave but is provided with a very slight idle or dead time interval during the commutation so that transistor pairs Q1, Q2 and Q3, Q4 will not be turned on at the same time, which would result in a current path across the line directly through two series-connected transistors, resulting in serious damage. The slight delay time is provided by the clock pulses to the base drive of Q5 and Q6 in the inverter driver circuits.

There are two inverter circuits in this system and they are operated 90° out-of-phase so that the full wave output of one inverter circuit overlaps the idle or dead interval between the two half-cycles of the other inverter output wave form. This insures that the combined full wave rectified output will not have depressed or valley portions between each half-cycle. If one were to operate single phase and provide a filter circuit to remove the depression between the half-cycle, it would take a very large inductor capacitor circuit because of the very high currents provided with this power supply. By overlapping the two phase outputs, it is not necessary to provide large capacitors and practically pure DC level is obtained without or with very little filtering. There is very small step-down in the output voltage level where each idle period appears in the output wave form of the two inverters, but this is of minor consequence. By going to this two phase system in lieu of a large amount of capacitor filtering, the amount of filter capacitance needed on all of the power outputs has been reduced and the size and the weight of the power supply substantially reduce. Although the circuitry for an added inverter and inverter driver, including its transformer, has been added, the overall savings in size is very significant.

Figure 6:
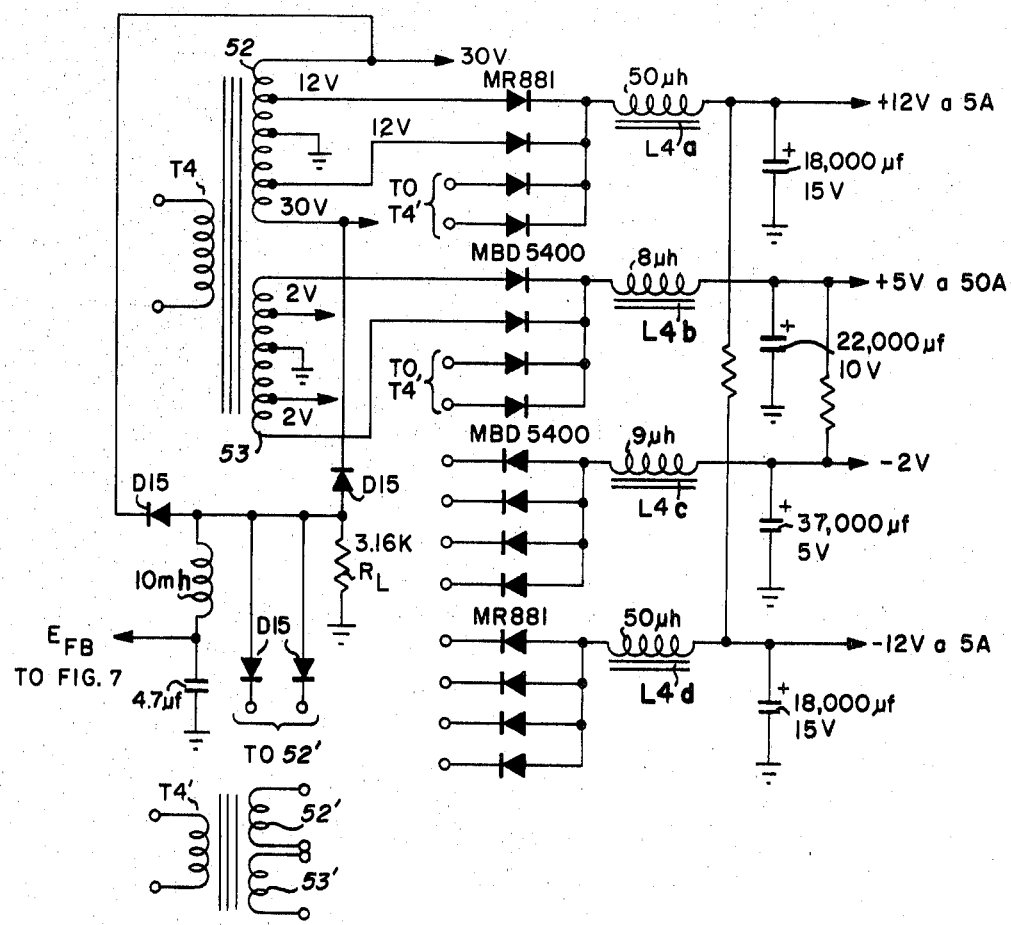
FIG. 6 is a schematic diagram of one of the rectifier circuits of the power supply.

Referring to FIG. 6, the primary winding of each inverter circuit transformer T4 and T4' is coupled to a pair of secondary windings 52, 53 and 52', 53', respectively, each being center tapped and also having a plurality of taps to provide the desired voltage output levels. This two phase, full wave rectification provides a pluraltiy of separate DC voltage level outputs, for example 30.0 volts, 12.0 volts, 5.0 volts and 2.0 volts. As noted above, because the two phase operation provides fill in between the individual half wave segments, relatively small inductors L4a-d may be used in the output filter circuits.

One of the 30 volt DC outputs is coupled to the input of a switching mode regulator circuit 19 (see FIG. 1) to obtain a regulated voltage output adjustable between, for example, 18.5 volts and 24.5 volts. A −20V output is obtained from another 30V line via regulator circuit 19.

Figure 7:
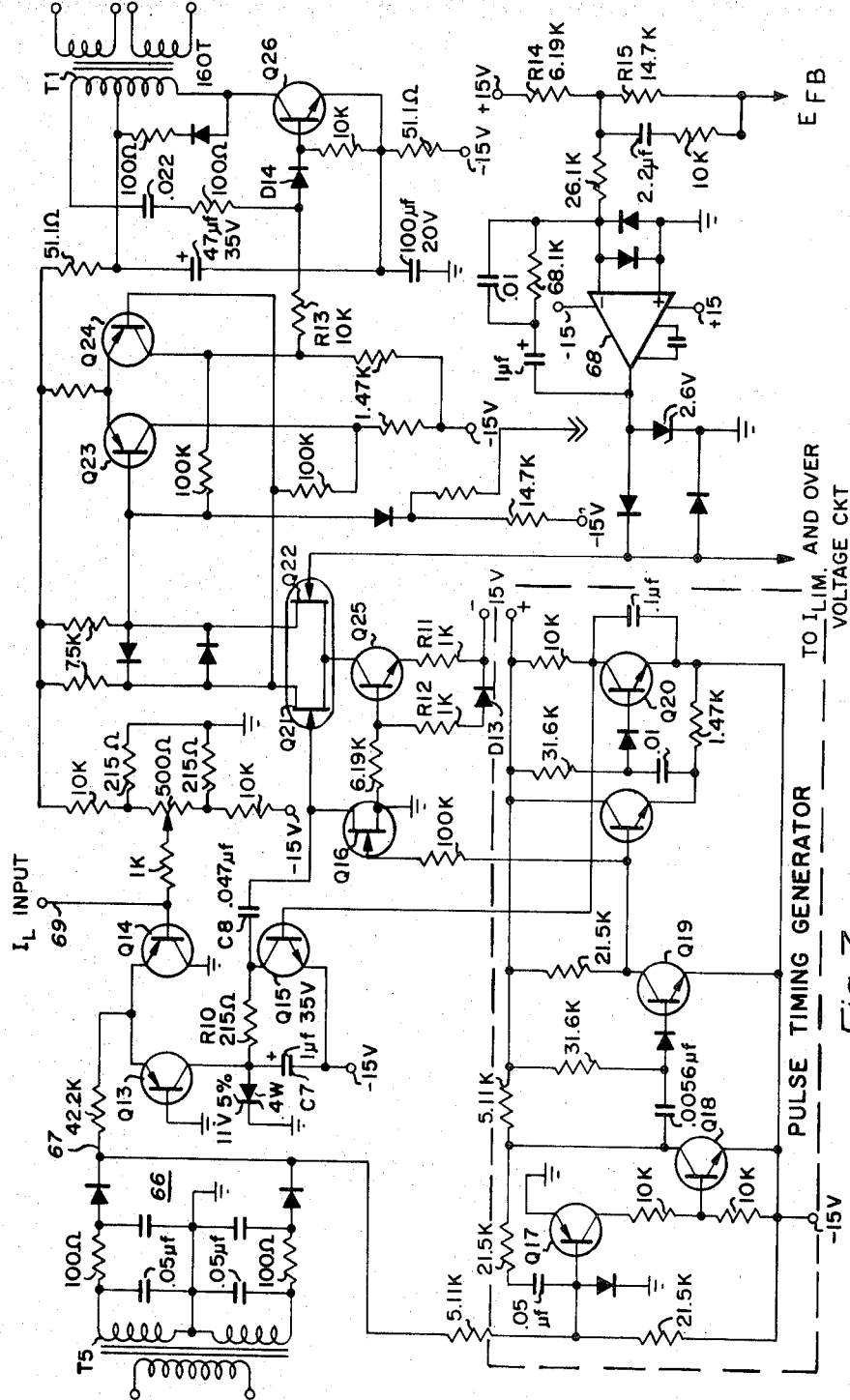
FIG. 7 is a schematic diagram of the preregulator control circuit of the power supply.

A preregulator control circuit shown in FIG. 7 is provided to generate an output function such that, should the supply line voltage change, the firing angles of the two SCR's D1 and D2 in the input bridge circuit change by a time increment just sufficent to hold the DC level output of the bridge constant. This provides a first regulation of the output line. Precise control of the output voltage is provided by the novel flux sensing technique described below.

Figure 8:
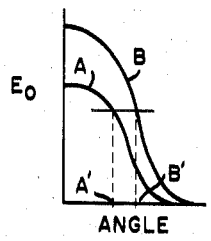
FIG. 8 shows traces illustrating the relationship between the firing angle of the SCR's in the preregulator circuit of FIG. 2 and the voltage level of the input waveform.

The traces in FIG. 8 illustrate the relationship between the firing angle of the SCR's D1 and D2 and the voltage level of the input wave form needed to maintain a constant voltage level output from the bridge circuit of, for example 160 volts. It is seen that, for a low level input line voltage represented by curve A, a firing angle represented by point A' is required whereas with a high level of input voltage represented by line B a different firing angle B' is dictated. A means of developing the proper triggering time in response to line voltage is given below.

Figure 9:
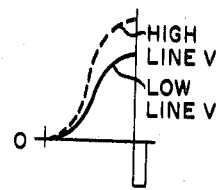
FIG. 9 shows traces illustrating the charge time of the capacitor in the integrator circuit of the preregulator control circuit of FIG. 7.
Figure 10:
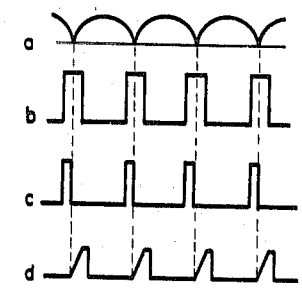
FIG. 10 illustrates the timing pulses in the preregulator control circuit of FIG. 7.

The input voltage is supplied through transformer T5 to a full wave rectifier circuit 66 which produces a rectified wave form output at 67 as shown in FIG. 10a. A similar current wave form passes into the emitter of Q13 of an integrator circuit including the capacitor C7. The amount of current passing to C7 may be controlled by means of Q14. The charge on capacitor C7 rises as shown in FIG. 9 during the half-cycle period. A reset pulse on the base of Q15 from the pulse timing generator at about the zero point in the full wave rectified wave form resets the integrating circuit, and the voltage at the collector of Q15 drops to a low value. Resistor R10 limits the capacitor discharge current. The collector volage of Q15 drops to the point where Q15 is saturated, and it remains saturated for a short period until the base of Q15 is turned off and the voltage at the collector rises and the integration cycle begins again.

It is desired that the base level of this wave form be established at the peak point of the integration curve and that the lower level of this voltage wave form be allowed to vary in accordance with the line voltage variance. In this manner, the lower level will vary in direct relationship to the voltage level of the input line, a high input voltage giving a greater voltage excursion for the integrated wave form than a lower input voltage. Establishment of the base level at the top of the integrated wave form is provided by the DC restorer circuit comprising the FET switch Q16 which operates on each half-cycle to establish the right-hand side of capacitor C8 at ground level just prior to reset of the integrator. The FET switch Q16 is turned on and off by a pulse from the pulse timing generator just prior to delivery of the reset trigger pulse to Q15.

The pulse timing generator comprises the circuit shown in the dotted line enclosure. This circuit operates from the input wave form (see FIG. 10a) at the base of Q17 to produce a rectangular wave form (see FIG. 10b) at the base of Q18, a reset pulse (see FIG. 10c) at the collector of Q19 used to operate the FET switch Q16, and a reset signal (see FIG. 10d) at the collector of Q20 that has an initial ramp portion building up to the turn-on voltage level required by reset transistor Q15. The ramp portion of the waveform shown in FIG. 10d is to allow sufficient time delay for the FET switch Q16 to perform the DC restoration before the integrator circuit is reset.

A comparator circuit is formed by a differential amplifier stage including FET's Q21 and Q22 and a flip-flop or DC coupled multivibrator stage including transistors Q23 and Q24. Transistor Q25, resistors R11 and R12, and diode D13 comprise a constant current source for the differential amplifier stage. The voltage on the input of the input FET Q21 of the differential amplifier is compared with the amplified feedback voltage applied to FET Q22 from a differentiail amplifier 68. When the input level to the FET Q21 reaches the voltage established at the gate of FET Q22, the flip-flop circuit Q23 and Q24 is operated to produce a square pulse output. The width of the output pulse is dependent on the time interval between the comparator level cross-over and the integrator reset, which time interval is in turn dependent on the voltage level of the input line to the gate of FET Q22.

The output of the flip-flop Q23 and Q24 is coupled to a blocking oscillator circuit which includes the transistor Q26, the output of the flip-flop being coupled to the oscillator via resistor R13 and diode D14. When the left-hand side of R13 is elevated above −15 volts by about 3 volts, current flows through diode D14, developing a voltage drop across resistor R13. A portion of the current flows through the base-emitter junction of Q26, causing it to conduct and pass current through the primary winding of transformer T1. This initiates a series of pulses from the blocking oscillator Q26. The secondary windings of the transformer T1 are the SCR gate control windings shown in FIG. 2.

This blocking oscillator works in a regenerative fashion to produce a series of output pulses for the interval that the flip-flop Q23 and Q24 is on, i.e., as long as a high input appears at the base of transistor Q26. The time of initiation of this series of pulses is dependent on the width of the pulse generated by the flip-flop and is thus dependent on the amplitude of the input voltage applied to the gate of FET Q22. A series of trigger pulses is provided rather than a single SCR gating pulse to insure that, should the SCR not be in condition to be triggered or turned on upon receipt of the first trigger pulse, it will be turned on at the first opportunity by a subsequent pulse in the trigger pulse series. This insures that the bridge circuit will not miss a cycle of operation in the AC rectification.

Provisions are made to enable the turn-off of the SCR trigger pulses so that the regulator operation may be terminated. IN one case, either a −15 volt "off" voltage or +15 volt "on" voltage may be connected to the input of Q23 transistor. In another instance, control may be accomplished by a +15 volt "off" voltage or a −15 "on" voltage at the gate of FET Q22.

The gain of this system may be regulated in response to an input voltage derived from the load current and applied to the base of multiplier Q14, which multiplies the input voltage at input 69 by the current derived for the integrator circuit from the input transformer T5. This input voltage serves to direct current flow between the two transistors Q13 and Q14 and thus regulates the current flow into the integrator capacitor C7. The multiplier control voltage is derived from load current sensing circuits comprising current transformers T6 and T6' and the associated rectifiers D16 and amplifier circuit 71 (see FIG. 4). Current transformers T6 and T6' are connected in series with the primaries of the inverter transformers T4 and T4', respectively.

The amplifier 71 provides an output voltage which is a function of the total load current being delivered to the load. As the total load current increases, the output of amplifier 71 increases to thereby increase the voltage on the base of transistor Q14, causing less current to flow through transistor Q14 and more current to flow through transistor Q13 to the capacitor C7. This capacitor charges up more rapidly and thus the magnitude of the waveform appearing at the input to the comparator amplifier Q21 and Q22 is multiplied, adjusting the gain crossover of this regulation loop to maintain a stable loop with fast response. A decreasing load current will result in less current through transistor Q13 and a reduction in the gain to maintain an optimum gain crossover. Thus, fast response time is maintained and a stable loop obtained over a wide range of load current variation.

The input signal fed back to the preregulator control circuit to control the differential amplifier 68, and thus control the firing time of the SCR's D1 and D2, could be obtained from one of the output load circuits. This would serve to regulate the output voltage relative to that particular output voltage level, but would result in a relatively poor regulation of the other DC output levels. For this reason, a feedback signal is derived which is proportional to the flux density of the transformers T4 and T4' shown in FIGS. 3 and 6. In this embodiment, the flux is sensed with the 30 volt transformer secondary winding by means of the flux sensing diodes D15, a separate pair of such diodes being coupled to each 30 volt secondary of the two inverter transformers T4 and T4'. The diodes D15 are poled so as to pass current only when the associated section of the secondary winding is unloaded, i.e., during that half of the cycle when the other section of the secondary winding is carrying the load current. Under this unloaded condition, the voltage generated across the unloaded secondary is $Nd\Phi/dt$ and the feedback voltage signal is $$E_{FB} = Nd\Phi/dt - E(R \text{ secondary winding and } R \text{ diode})/R_L - V \text{ diode}.$$

Since, with no current flowing in the circuit, the latter two values are relatively small and constant, $E_{FB} = k\, Nd\Phi/dt$. This feedback voltage is thus dependent on $Nd\Phi/dt$ and is compared to the reference voltage +15V by resistor network R14 and R15, thus generating an error signal at the input to amplifier 68.

The output of amplifier 68 changes the level of comparison at the input of comparator Q21 and Q22 in such a manner as to adjust the firing angle of the SCR's D1 and D2 as described above. Thus the flux in the inverter transformers T4 and T4' is maintained constant, insuring good output line regulation.

Certain features of this power supply including those relating to the voltage doubling feature provided by the preregulator bridge circuit, the ripple reduction feature incorporated in the output of the bridge, and the timing generator system for controlling the turn on time of the SCR's are described and claimed in a continuation of U.S. Pat. application Ser. No. 144,618 filed on May 18, 1971, by Gregory Justice, entitled "High Efficiency Power Supply," and assigned to the same assignee as this application. This continuation application was filed on Jan. 29, 1973.

What is claimed is:

1. A DC power supply for converting AC voltage on an input supply line to a plurality of separate DC voltages, said DC power supply comprising:
   a rectifier bridge circuit including controlled rectifier switches, having an input connected across the input supply line, and being operable for producing a DC voltage at an output of the rectifier bridge circuit;
   a first inverter circuit coupled to the output of the rectifier bridge circuit for receiving the DC voltage produced by the rectifier bridge circuit;
   drive means coupled to the first inverter circuit for operating it at a selected alternating rate substantially higher than the alternating rate of the AC voltage on the input supply line to produce an AC voltage at an output of the first inverter circuit;
   an output rectifier circuit including a first transformer and being coupled to the output of the first inverter circuit via the first transformer for converting the AC voltage produced by the first inverter circuit to a plurality of separate DC voltages provided at a plurality of separate outputs of the output rectifier circuit;
   flux sensing means for sensing the flux in the first transformer; and
   a control circuit coupled to the controlled rectifier switches and responsive to the flux sensed in the first transformer for controlling the turn-on time of the controlled rectifier switches and thereby maintaining a constant flux density in the first transformer to regulate the DC voltages provided at the outputs of the output rectifier circuit.

2. A DC power supply as in claim 1 wherein said flux sensing means comprises:
   means coupled to a secondary winding of the first transformer for sensing the voltage across the secondary winding in the unloaded condition with no load current flowing therein; and
   means for producing a feedback signal from the voltage sensed across the secondary winding of the first transformer to control the turn-on time of the controlled rectifier switches.

3. A DC power supply as in claim 1 wherein:
   said DC power supply includes a second inverter circuit coupled to the output of the rectifier bridge circuit;
   said drive means is coupled to the second inverter circuit for operating it at the selected alternating rate to produce an AC voltage at an output of the second inverter circuit, the AC voltage produced at the output of the second inverter circuit being out-of-phase with respect to the AC voltage produced at the output of the first inverter circuit;
   said output rectifier circuit also includes a second transformer and is coupled to the outputs of both the first and second inverter circuits via the first and second transformers, respectively, for converting the AC voltages produced by the first and second inverter circuits to the DC voltages provided at the output of the output rectifier circuit;
   said flux sensing means is operable for sensing the flux in both the first and second transformers; and
   said control circuit is responsive to the flux sensed in both the first and second transformers for controlling the turn-on time of the controlled rectifier switches and thereby maintaining a constant flux density in the first and second transformers to regulate the DC voltages provided at the outputs of the output rectifier circuit.

4. A DC power supply as in claim 1 wherein said controlled rectifier switches are SCR's.

5. A DC power supply for converting incoming AC voltage on an input supply line to a plurality of separate output DC voltages for associated load circuits, said DC power supply comprising:
   a preregulator including a rectifier bridge circuit for converting the incoming AC voltage to a DC voltage provided at an output of the preregulator, said rectifier bridge circuit including controlled rectifier switches;

conversion means coupled to the output of the preregulator for converting the DC voltage provided at the output of the preregulator to an AC voltage and for subsequently converting this AC voltage into a plurality of separate output DC voltages provided at a plurality of separate outputs of the conversion means;

a control circuit for controlling the turn-on time of the controlled rectifier switches and thereby regulating the level of the DC voltage provided at the output of the preregulator, said control circuit including an amplifier and being responsive to changes in the incoming AC voltage for changing the turn-on time of the controlled rectifier switches; and feedback means coupled to the control circuit and responsive to load current variations at the outputs of the conversion means for providing a feedback signal to adjust the gain of the amplifier and provide optimum gain crossover in the regulation loop comprising the preregulator, conversion means, and control circuit.

6. A DC power supply as in claim 5 wherein:

said conversion means includes a first inverter circuit, a plurality of full wave rectifier circuits coupled to the outputs of the conversion means, and a first transformer including a primary winding coupled to an output of the first inverter circuit and including a plurality of secondary windings coupled to the full wave rectifier circuits;

said conversion means further includes drive means coupled to the first inverter circuit for operating it at a selected alternating rate substantially higher than the alternating rate of the incoming AC voltage on the input supply line to produce an AC voltage at the output of the first inverter circuit;

said power supply includes flux sensing means for sensing the flux in the first transformer; and said control circuit includes means responsive to the flux sensed in the first transformer for controlling the turn-on time of the controlled rectifier switches and thereby maintaining a constant flux density in the first transformer to regulate the output DC voltages provided at the outputs of the conversion means.

7. A DC power supply as in claim 6 wherein said flux sensing means comprises:

means coupled to a secondary winding of the first transformer for sensing the voltage across the secondary winding in the unloaded condition with no load current flowing therein; and means for producing a feedback signal from the voltage sensed across the secondary winding of the first transformer to control the turn-on time of the controlled rectifier switches.

8. A DC power supply as in claim 6 wherein:

said conversion means includes a second inverter circuit, and a second transformer having a primary winding coupled to an output of the second inverter circuit and having a plurality of secondary windings coupled to the full wave rectifier circuits;

said drive means is coupled to the second inverter circuit for operating it at the selected alternating rate to produce an AC voltage at the output of the second inverter circuit, the AC voltage produced at the output of the second inverter circuit being out of phase with respect to the AC voltage produced at the output of the first inverter circuit;

said flux sensing means is operable for sensing the flux in both the first and second tranformers; and said control circuit is responsive to the flux sensed in the first and second transformers for controlling the turn-on time of the controlled rectifier switches and thereby maintaining a constant flux density in the first and second transformers to regulate the DC voltages provided at the outputs of the conversion means.

9. A DC power supply as in claim 6 wherein said controlled rectifier switches are SCR's.

* * * * *

UNITED STATES PATENT OFFICE
CERTIFICATE OF CORRECTION

Patent No. 3,758,840                    Dated September 11, 1973

Inventor(s) Bernard M. Oliver

It is certified that error appears in the above-identified patent and that said Letters Patent are hereby corrected as shown below:

Column 1, line 25, after "multiple" delete -- output --; line 53, "circuits" should read -- circuit --; line 56, after "rectifier bridge" insert -- to maintain a desired --;

Column 2, line 32, after "115" insert -- or 230 --; line 60, after "different" insert -- output --;

Column 3, line 40, "thrugh" should read -- through --;

Column 4, line 33, "substantialy" should read -- substantially --;

Column 5, line 45, "This 160 line" should read -- The 160 volt line --;

Column 6, line 25, "inductor capacitor" should read -- inductor-capacitor --; line 37, "reduce" should read -- reduced --;

Column 7, line 25, "volage" should read -- voltage --; line 66, "differentiail" should read -- differential --;

Column 8, line 38, "IN" should read -- In --; line 40, "Q23 transistor" should read -- transistor Q23 --.

Signed and sealed this 25th day of December 1973.

(SEAL)
Attest:

EDWARD M. FLETCHER, JR.          RENE D. TEGTMEYER
Attesting Officer                Acting Commissioner of Patents